US011497166B2

(12) United States Patent
Reubens et al.

(10) Patent No.: US 11,497,166 B2
(45) Date of Patent: Nov. 15, 2022

(54) BELT DRIVE FOR DRIVING THE HEADER OF A COMBINE HARVESTER

(71) Applicant: CNH Industrial America LLC, New Holland, PA (US)

(72) Inventors: Sam Reubens, Sint-Michiels (BE); Frederik Tallir, Esen (BE); Dré W. J. Jongmans, Klundert (NL); Bart M. A. Missotten, Herent (BE); Pieter Van Overschelde, Sint-Andries (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/710,339

(22) Filed: Mar. 31, 2022

(65) Prior Publication Data

US 2022/0312676 A1 Oct. 6, 2022

(30) Foreign Application Priority Data

Mar. 31, 2021 (EP) ..................................... 21166218

(51) Int. Cl.
*A01D 41/14* (2006.01)
*A01D 41/16* (2006.01)
(Continued)

(52) U.S. Cl.
CPC ........... *A01D 41/142* (2013.01); *A01D 41/16* (2013.01); *A01D 41/12* (2013.01); *A01D 41/14* (2013.01);
(Continued)

(58) Field of Classification Search
CPC ...... A01D 41/142; A01D 41/16; A01D 41/12; A01D 41/14; A01D 61/008; A01F 12/10; A01F 12/46; B65G 23/44
See application file for complete search history.

(56) References Cited

U.S. PATENT DOCUMENTS 3,971,390 A * 7/1976 McDuffie ................ A01F 12/16 460/106
4,567,719 A 2/1986 Soots et al.
(Continued)

FOREIGN PATENT DOCUMENTS

EP 0448844 A1 * 2/1991 ............. A01D 41/14
EP 1044595 A1 * 10/2000 ............. A01D 41/14
(Continued)

OTHER PUBLICATIONS

Extended European Search Report for EP Application No. 21166218.4 dated Sep. 24, 2021 (5 pages).

*Primary Examiner* — Arpad Fabian-Kovacs
(74) *Attorney, Agent, or Firm* — Peter Zacharias; Patrick Sheldrake

(57) ABSTRACT

A combine includes a feeder housing that include a movable cradle frame at the front, configured to receive a header, so that a controlled movement of the cradle frame may be imparted to the header during a harvesting run. The combine further includes a driveline for driving moving components of the combine header. The driveline includes a belt drive mounted laterally with respect to the feeder housing. The belt drive is configured to transfer a rotation of a first drive axle that is part of the driveline, to a rotation of a second axle to which a drive axle of the header can be coupled. The belt drive includes two pulleys which are maintained in a common plane regardless of movement of the header relative to the feeder housing. The pulleys are rotatably mounted in a longitudinally extendable bridge structure, and are coupled to the first and second axles.

17 Claims, 6 Drawing Sheets

(51) Int. Cl.

| | |
|---|---|
| *A01D 41/12* | (2006.01) |
| *A01F 12/46* | (2006.01) |
| *B65G 23/44* | (2006.01) |
| *A01D 61/00* | (2006.01) |
| *A01F 12/10* | (2006.01) |

(52) U.S. Cl.

CPC ............ *A01D 61/008* (2013.01); *A01F 12/10* (2013.01); *A01F 12/46* (2013.01); *B65G 23/44* (2013.01)

(56) References Cited

U.S. PATENT DOCUMENTS

| | | | | |
|---|---|---|---|---|
| 6,116,008 | A * | 9/2000 | Digman ............... | A01D 61/008 56/15.8 |
| 6,318,058 | B1 * | 11/2001 | Emmert ............... | A01D 61/008 56/14.6 |
| 6,330,782 | B1 * | 12/2001 | Digman ............... | A01D 61/008 56/15.8 |
| 7,585,238 | B2 | 9/2009 | Ducoulombier | |
| 8,065,865 | B1 | 11/2011 | Dow et al. | |
| 8,266,881 | B2 | 9/2012 | McIlwain | |
| 8,281,561 | B2 | 10/2012 | Dow et al. | |
| 8,495,855 | B1 | 7/2013 | Conrad et al. | |
| 9,248,971 | B2 | 2/2016 | Wolters et al. | |
| 9,526,206 | B2 | 12/2016 | Schulze Rückamp et al. | |
| 10,433,479 | B2 | 10/2019 | Honey et al. | |
| 10,945,373 | B2 * | 3/2021 | Donohoe ............. | A01D 61/008 |
| 2007/0197272 | A1 * | 8/2007 | Ramp ..................... | A01F 12/10 460/16 |
| 2013/0313077 | A1 * | 11/2013 | Boyd ..................... | B65G 23/44 198/832 |
| 2015/0366139 | A1 * | 12/2015 | Rittershofer ........... | A01D 41/14 460/114 |
| 2017/0251606 | A1 * | 9/2017 | Van Overschelde .. | A01D 61/02 |
| 2018/0007832 | A1 | 1/2018 | Matousek et al. | |
| 2019/0008094 | A1 | 1/2019 | Barnett et al. | |
| 2019/0124832 | A1 | 5/2019 | DeChristopher | |

FOREIGN PATENT DOCUMENTS

| | | | | |
|---|---|---|---|---|
| EP | 1346625 | B1 * | 2/2007 | ............. A01B 71/06 |
| EP | 2147589 | A1 | 1/2010 | |
| EP | 2574228 | A1 * | 4/2013 | ........... A01D 41/142 |
| GB | 1404257 | A | 8/1975 | |
| JP | 2018088899 | A * | 6/2018 | ............. A01D 61/00 |
| WO | 2011/095525 | A1 | 8/2011 | |

* cited by examiner

BELT DRIVE FOR DRIVING THE HEADER OF A COMBINE HARVESTER

FIELD OF THE INVENTION

The present invention is related to combine harvesters, in particular to the driveline for actuating the operation of the header of the combine.

BACKGROUND OF THE INVENTION

Agricultural combine harvesters are machines designed for harvesting and processing crops such as wheat or corn. Crops are cut from the field on a wide area by the header mounted at the front of the combine. By an auger or a belt system included in the header, the harvested material is brought to a central area of the header, and from there it is transported by the feeder to a threshing mechanism comprising laterally or longitudinally mounted threshing rotors and further to the cleaning section comprising a number of sieves where grains are separated from any remaining crop residue.

The header is suspended on a cradle frame attached at the front of the feeder. In modern combines, this cradle frame is movable with respect to the feeder housing in order to allow a freedom of movement to the header during the harvesting operation. The cradle frame is usually configured so that a pivoting motion is allowed both around a horizontal axis that is perpendicular to the longitudinal axis of the harvester and about a second axis parallel to said longitudinal axis. The first degree of freedom allows the cradle and thereby the header to be tilted forward or backward relative to the feeder housing, while the second degree of freedom allows a lateral flotation of the header.

A known way of operationally coupling the header to the combine utilises a driveline from the combine's power source to the header which passes along one side of the feeder where it is coupled to a drive axle on the header through a transverse gearbox, configured to transfer the rotation of the driveline oriented in the forward direction of the combine to a rotation of the header drive axle oriented transversally to said forward direction. In presently known systems of this type, the transverse gearbox is bolted to the side of the feeder, which requires a complex rotational connection between the gearbox and the header's drive axle in order to allow the header to undergo the above-described movements relative to the feeder. The angular range of said rotational connection however limits the amplitude of the header's movements, especially when both degrees of freedom, tilting and lateral floatation, are simultaneously available.

As combines increase in size and as the requirements in terms of the header movement increase, the existing mechanisms are therefore no longer sustainable.

SUMMARY OF THE INVENTION

The present invention is related to a combine harvester in accordance with the appended claims. In a harvester according to the invention, the driveline for driving the moving components of the combine header comprises a belt drive mounted laterally with respect to the feeder housing. The feeder is the crop transport device mounted at the front of the combine, to which the header is removably attached. The invention is related to combines equipped with a feeder housing that comprises a movable cradle frame at the front, configured to receive the header, so that a controlled movement of the cradle frame, for example a forward/backward tilting and sideways tilting movement, may be imparted to the header during a harvesting run. The belt drive is configured to transfer the rotation of a first drive axle that is part of the driveline, to the rotation of a second axle that is mounted on and rotatable with respect to the movable cradle frame and to which the drive axle of the header can be coupled. According to the invention, the belt drive comprises two pulleys which are maintained in a common plane regardless of the movement of the cradle frame and thereby of the header, relative to the feeder housing. To this aim, the pulleys are rotatably mounted in a longitudinally extendable bridge structure, and the pulleys are coupled to the first and second axles through couplings which allow a misalignment between the pulleys and the axles, for example through universal joints.

The invention thereby enables the use of a belt drive for driving a combine header that is movable relative to the feeder housing. The belt drive is operational without undue loads on the belt or misalignment of the pulleys, regardless of the header's position relative to the feeder. Optionally, a belt drive is mounted on both sides of the feeder housing.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims. The terms 'front' and 'back' or 'rear' are referenced to the front and back side of the combine harvester. The 'forward direction' of the combine harvester refers not to a single geometrical axis but to the general direction from the rear of the vehicle to the front.

Figure 1:
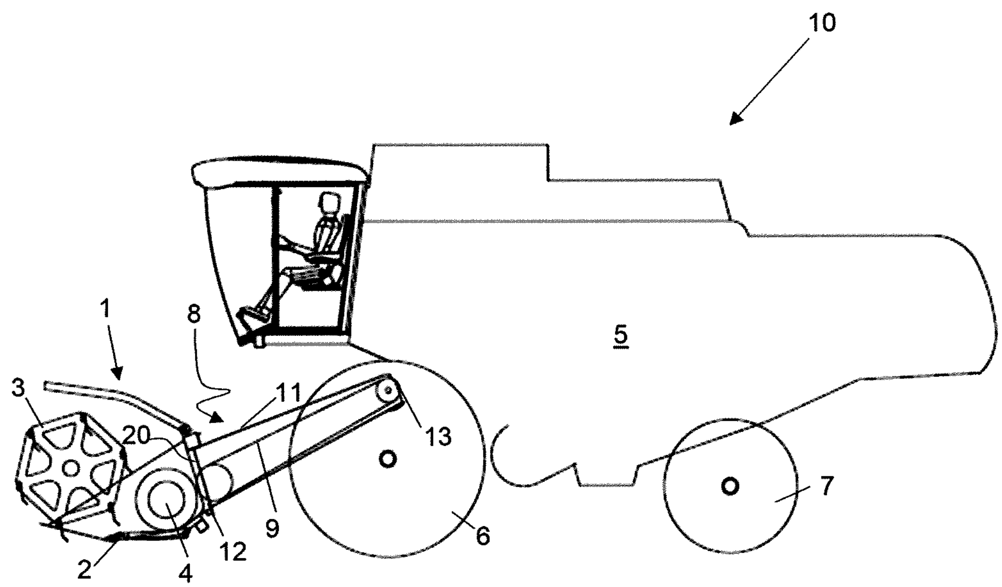
FIG. 1 is a schematic side view of a combine header as known in the art, indicating the position of the header and the feeder at the front of the machine.

FIG. 1 is a schematic image of a combine harvester 10 as known today, comprising a header 1 mounted at the front of the combine. The header comprises knives 2 maintained at a given height above ground level while the combine moves through a field of crops that are to be harvested. A rotating reel 3 guides the crops towards the knives. Cut crops are transported from both lateral sides of the header towards a central area by an auger 4. The main body 5 of the combine is supported by front and rear wheels 6 and 7 and comprises the threshing rotors and cleaning section generally known by the skilled reader and not depicted as such in FIG. 1. From the central area of the header 1, crops are transported into the main body 5 of the combine by a feeder 8. The feeder 8 is inclined upwards from the header 1 towards the main body 5 and comprises moving belts 9 inside a housing 11. The belts transport the crops upwards, from an inlet section 12 of the feeder to an outlet section 13. At the front of the feeder, a cradle frame 20 is mounted, onto which the header 1 is mounted and secured. As described in the introductory portion, the cradle frame 20 is movable relative to the feeder 8. The cradle frame may at least be pivotable about a tilting axis for tilting the header forward or backward, and preferably also about a longitudinal axis for allowing the header to undergo a lateral flotation. These movements are controlled by actuators (not shown) mounted between the feeder housing 8 and the cradle frame 20. The rotation of the reel 3 and the auger 4 is driven by a header drive axle which is itself rotatably coupled to the driveline of the combine as described in the introductory portion.

Figure 2:
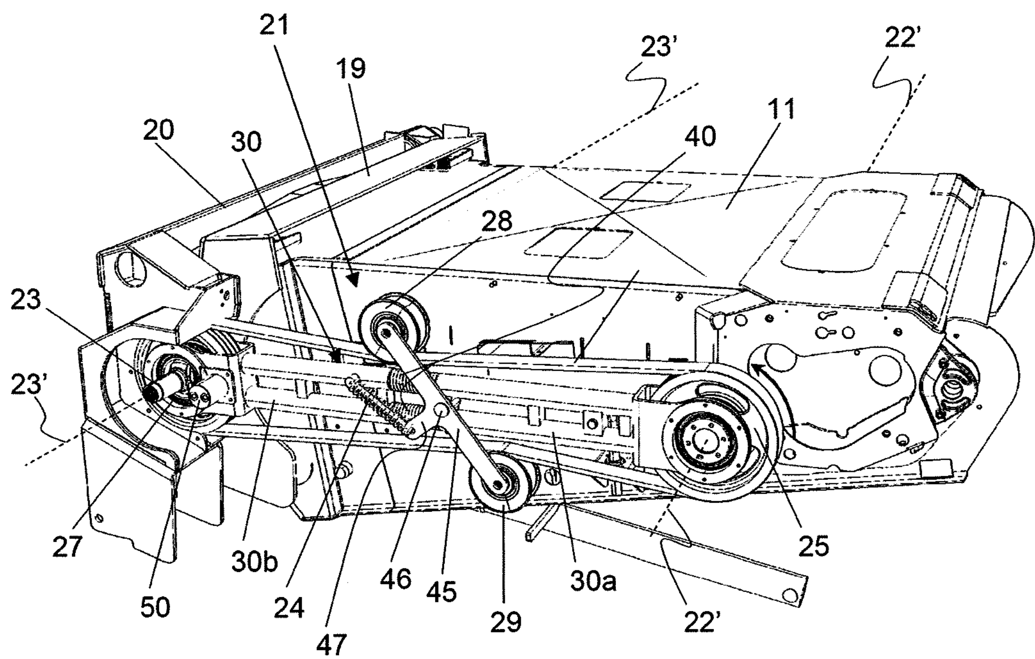
FIG. 2 shows one side of the feeder housing of a combine harvester, provided with a belt drive in accordance with an embodiment of the invention.

FIG. 2 shows a detail of one side of the feeder 8, in a combine harvester according to an embodiment of the invention. The feeder housing 11 and the cradle frame 20 are indicated in the drawing. The cradle frame 20 is mounted on a tiltable front portion 19 of the feeder. The tiltable portion 19 is capable of tilting forward and backward with respect to the feeder housing 11. The cradle frame 20 itself is mounted on the tiltable portion 19 and is configured to perform a sideways swinging motion with respect to said tiltable portion 19, about an axis oriented in the driving direction of the harvester. Actuators (not shown) are provided for driving the forward/backward and sideways movements of the tiltable portion 19 and of the cradle frame 20.

The harvester's driveline for driving the movement of the components of the header, such as the knives 2 and the auger 4, comprises a belt drive 21 arranged on the side of the feeder housing. The belt drive 21 transfers the rotation of a first axle 22, visible in FIGS. 5*a* and 5*b*, about central rotation axis 22' shown in FIG. 2, to a second axle 23 that rotates about central rotation axis 23'. Onto the second axle 23, a drive axle of the header will be coupled when the header is attached to the cradle frame 20. The header's drive axle will preferably be coupled colinearly with the second axle 23.

The rotation of the first axle 22 is driven by the remainder of the driveline that is not shown in detail in FIG. 2, and which may comprise multiple drive shafts and gearboxes configured according to any arrangement known in the art, and driven by a power source within the harvester. This may be the engine of the harvester or a separate hydraulic or electric motor.

The belt drive 21 comprises a first pulley 25 mounted on the first axle 22, a belt 26 and a second pulley 27 mounted on the second axle 23. The arrow indicates the direction of the standard operational angular rotation of the belt drive 21, i.e. the rotation applied for the normal operation of the header during a harvesting run. At least one tension roller 28 is present for tensioning the belt 26 through the action of a compression spring 24. It is well known that instead of a compression spring, also a tension spring or torsion spring can be used to apply tension to a belt via a tension roller. In the embodiment shown in the drawings, a second tension roller 29 is present on the opposite side of the belt. The tension roller assembly shown in FIG. 2 will be described in more detail later in this description.

The central rotation axis 22' is fixed with respect to the feeder housing 11. This means that the first axle 22 is rotatable relative to the feeder housing through a set of bearings which are fixedly mounted with respect to said feeder housing. These bearings 70 are not visible in FIG. 2 but they are visualized in FIGS. 5*a* and 5*b*. Likewise, the central rotation axis 23' of this second axle 23 is fixed with respect to the cradle frame 20, i.e. the axle 23 is rotatable relative to the cradle frame 20 through a set of bearings which are fixedly mounted with respect to the cradle frame 20. These bearings 71 are visualized also in FIG. 4 and FIGS. 5*a* and 5*b*. This means that as the cradle frame 20 moves relative to the feeder housing 11 under the influence of the forward/backward and sideways tilting actuators, the rotation axes 22' and 23' are in a constantly changing spatial relation one with respect to the other. The belt drive 21 is configured to be able to drive the rotation of the second axle 23, regardless of the spatial relation between these rotation axes 22' and 23', i.e. regardless of the position of the cradle frame 20 relative to the feeder housing 11.

Figure 3:
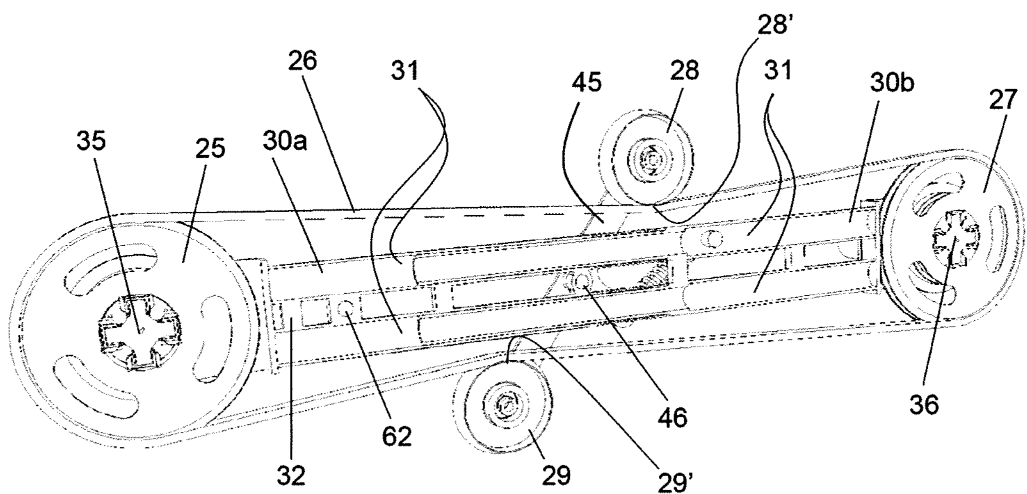
FIG. 3 is a section view of the belt drive according to the embodiment of FIG. 2, as seen from the side of the feeder housing.

To enable this characteristic feature of the invention, the pulleys 25 and 27 are configured to rotate relative to an extendable bridge structure 30 coupled between the pulleys. In addition to this, the rotation of the first and second axle 22,23 is coupled to the respective pulleys 25, 26 through joints which allow at least a minimal degree of angular misalignment between the rotation axes 22' and 23' of the first and second axle on the one hand, and the respective rotation axes of the first and second pulley 25 and 27 on the other. Preferably, two universal joints are applied, as is the case in the embodiment shown. The section view of FIG. 3 illustrates the position of the first and second universal joint 35 and 36. It is to be noted that FIG. 3 shows the belt drive 21 as seen from the side of the feeder housing, i.e. the position of the first and second pulleys is reversed compared to the view shown in FIG. 2.

FIG. 3 also illustrates the manner in which the bridge structure 30 is constructed according to the exemplary embodiment shown in the drawings. The bridge structure comprises a first and second portion 30*a* and 30*b*, which can move one relative to the other in the longitudinal direction of the belt drive 21. To this aim, the portions 30*a* and 30*b* of the bridge structure 30 each comprise a set of an upper and lower hollow tube 31 fixed to each other by transversal supports 32, wherein one set of tubes can slide inside the other set of tubes. The radial tolerance of the sliding tubes is minimal so that lateral motion of the bridge portions 30*a* and 30*b* one relative to the other is virtually excluded.

The bridge structure 30 may be brought into practice in various other ways than the one illustrated in the drawings. Instead of the structure with the sliding tubes 31, any structural form can be applied to the bridge portions 30*a* and 30*b* that allows a one-dimensional retraction or extension of the bridge structure as a whole. For example, one bridge portion could be in the form of a beam having a rectangular cross-section, while the other comprises a frame configured to move relative to the beam and in the longitudinal direction thereof, through a set of gliding or rolling elements (i.e. only a translation of the bridge portions relative to each other in the longitudinal direction is allowed, not a rotation).

Figure 4:
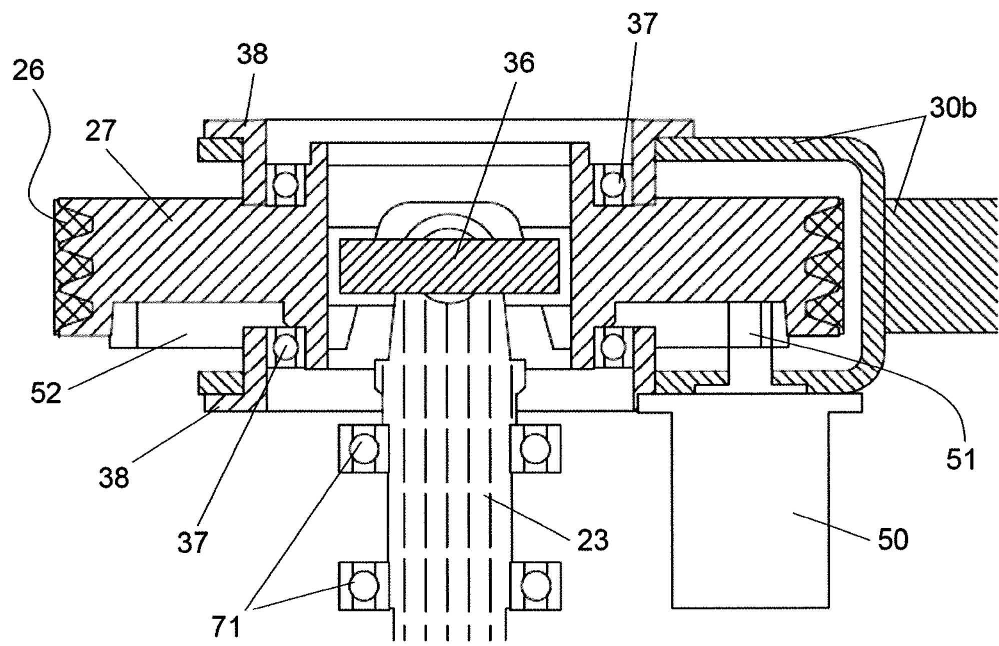
FIG. 4 is a section view of the driven pulley of the belt drive shown in FIGS. 2 and 3.
Figure 5A:
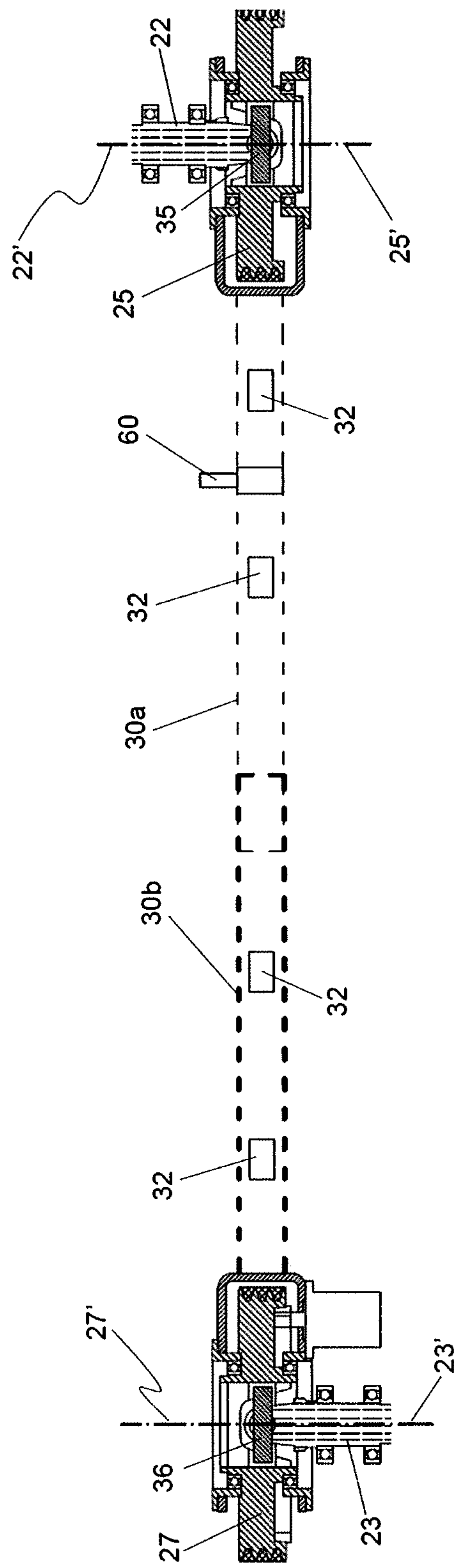
FIGS. 5*a* and 5*b* illustrate two possible positions of the rotating axles coupled by the belt drive illustrated in the preceding FIGS. 2 to 4.
Figure 5B:
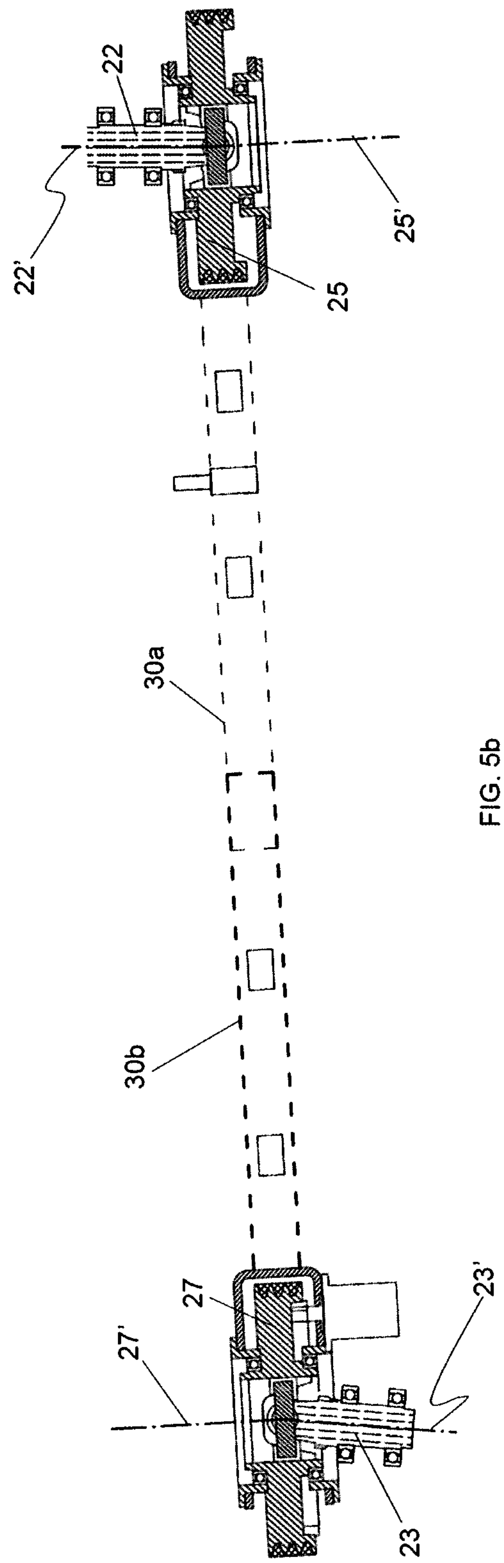

The section view of FIG. 4 shows that the second pulley 27 rotates relative to the bridge structure's second portion 30*b*, through a set of bearings 37 mounted between flanges 38 which are fixed to the bridge portion 30*b*, and an outer surface of the pulley 27. This means that the pulley 27 is not capable of undergoing any substantial movement relative to the bridge structure 30, other than the rotation about its central axis 27'. The first pulley 25 is mounted in the same way relative to the bridge structure's first portion 30*a*. As illustrated in FIGS. 5*a* and 5*b*, the central rotation axes 25' and 27' of the pulleys 25 and 27 are thereby kept parallel one relative to the other, by the bridge structure 30. At the same time, because of the presence of the universal joints 35 and 36, the central rotation axes 25' and 27' of the pulleys 25 and 27 are allowed to become misaligned with respect to the respective rotation axes 22' and 23' of the first and second axles 22 and 23. FIGS. 5*a* and 5*b* respectively show the belt drive 21 in a position where said rotation axes are aligned and non-aligned.

The extendable bridge structure 30 together with the universal joints 35 and 36 has the effect of maintaining the two pulleys 25 and 27 aligned in the same plane, regardless of the position of the cradle frame 20. In this way, the belt transmission 21 remains operational under optimal conditions in terms of the loads exhibited on the belt 26, when the cradle frame 20 is tilted back and forth and/or sideways with respect to the feeder housing 11. The bridge structure 30 as a whole may become tilted and may extend and retract as a function of the cradle frame movement, but the pulleys 25 and 27 remain in the same plane relative to each other and relative to the bridge structure 30.

According to the preferred embodiment shown in FIG. 2, the bridge structure 30 furthermore comprises springs 40 mounted between the two portions 30*a* and 30*b*. The springs 40 are mounted so as to act as compression springs, pushing the bridge portions 30*a* and 30*b* away from each other regardless of the relative position of these bridge portions 30*a* and 30*b*. At the same time, the spring force exerted by the springs 40 is insufficient to obstruct—within a given range—the relative movement of the bridge portions 30*a* and 30*b* actuated by the movement of the cradle frame 20. The fact that the springs 40 push the bridge portions away from each other counteracts forces acting on the universal joints 35 and 36 and oriented transversally with respect to the axles 22 and 23, as a consequence of the belt tension, and thereby increases the mechanical stability of the belt drive 21. The bridge structure 30 can however also be implemented without the springs 40.

The length of the belt 26 is configured in conjunction with an appropriate belt tensioning system, so that sufficient belt tension is applied for realizing the transmission of the rotation of the first axle 22 to the second axle 23, regardless of whether the bridge portions 30*a* and 30*b* are closer together or further apart, within a given operational range of the relative position of these bridge portions. In the embodiment represented in the drawings, a double tension roller assembly is provided comprising an upper and a lower tension roller 28 and 29. The assembly further comprises a bracket 45 that is pivotable relative to the bridge structure 30, about a pivot 46 oriented essentially perpendicularly to the bridge structure 30, and located on the first bridge portion 30*a*. The tension rollers 28 and 29 are rotatably mounted at the outer ends of the bracket 45. The bracket 45 is furthermore provided with a transversally oriented lever arm 47 that is coupled at its end to the second portion 30*b* of the bridge structure 30 through the compression spring 24. This latter compression spring 24 thus pushes the tension rollers 28 and 29 against the belt in respective upper and lower contact areas 28' and 29' (see FIG. 3).

The tensioning system may be equipped with a single tensioning roller instead of two tensioning rollers. In the embodiment shown in the drawings, at least the tensioning roller 28 at the top is required as the bracket 45 is oriented optimally for exerting tension to the belt when the belt drive is working in the forward operational direction indicated by the arrow in FIG. 2, which is the normal operational direction of the belt drive during a harvesting run. A particular feature of the invention is the fact that the distance between the pulleys 25 and 27 is variable, due to the extraction and extension of the bridge structure 30. When this distance becomes smaller, the length of the belt increases relatively to said distance and the tensioning system must be able to maintain a minimum required belt tension. The second tensioning roller 29 increases the overall belt displacement at the lower side of the belt drive, allowing it to compensate more of the excess belt length caused by the pulleys moving toward each other. The second roller 29 is thereby advantageous in maintaining a sufficient belt tension regardless of the relative position of the pulleys one with respect to the other. In addition, in the embodiment shown in the drawings, the orientation of the bracket 45 is such that the second roller 29 provides an optimal tensioning force when the belt drive operates in the reverse direction (see further).

It is particularly advantageous that the pivot 46 is located on one bridge portion 30*a* while the end point of the compression spring 24 is located on the other bridge portion 30*b*. In this way, the orientation of the spring 24 and the bracket 45, as well as the spring force exerted by the spring 24, are changing as a function of the relative position of the bridge portions 30*a* and 30*b*. Combined with an appropriately selected length and material of the belt 26 and appropriately designed dimensions of the bracket 45 and its lever arm 47, this allows to adjust the belt tension to an optimal value as the length of the bridge structure 30 extends or retracts. The tensioning system thereby acquires a self-regulating capacity. The invention is however not limited to the belt tensioning system shown in the drawings. For example, the pivot 46 and the point at which the compression spring 24 is attached to the bridge structure may be located on the same portion 30*a* or 30*b* of the bridge structure. In this case, the tensioning force applied by the rollers 28 and 29 on the belt is not or to a lesser degree dependent on the relative position of the bridge portions 30*a* and 30*b*. Other alternative tensioning systems may be equipped with a hydraulic or pneumatic piston instead of the compression spring 24.

As stated above, the presence of the two tension rollers 28 and 29 is useful for realizing optimal belt tension in both the forward and reverse rotational direction of the belt drive. Reversing the direction of rotation can be realized by constructing the driveline so that the rotation of the first axle 22 is reversible. Another way in which the reversibility may be realized is illustrated in the drawings and best visible in FIGS. 2 and 4. A hydraulic motor 50 is mounted on the second bridge portion 30*b*. The hydraulic motor drives a small gear 51 that drives the rotation of a larger internal gear 52 fixed to the pulley 27, in the direction opposite the normal rotational direction of the pulley when it is driven by the first axle 22. The motor 50 may be configured so that the small gear extends axially when the hydraulic motor is turned on and retracts when the motor is turned off. Alternatively, a clutch mechanism may be used for decoupling the hydraulic motor 50 from the small gear 51 when the belt drive is operating in the normal rotational direction.

According to an alternative embodiment, the hydraulic motor 50 is mounted on the cradle frame 20 and said motor is then configured to drive the inverse rotation of the second axle 23, by a suitable gear coupling between the small gear 51 driven by the hydraulic motor 50 and a larger gear fixed to the axle 23.

When the motor 50 reverses the direction of rotation of the belt drive 21, the complete driveline upstream of the belt drive 21 is reversed also, which may be allowable. However, any embodiment that includes the hydraulic motor 50 mounted in connection with the second axle 23 and the second pulley 27 may include a means for decoupling the first axle from the driveline of the harvester, when the belt drive is driven in the reverse direction.

Instead of the universal joints 35 and 36, the belt drive 21 could be equipped with homokinetic couplings, or if the misalignment between the axles 22 and 23 and the pulleys 25 and 27 is not too high, crowned spline couplings could be used. Various types of homokinetic couplings are well known, and include double cardan joints.

Figure 6:
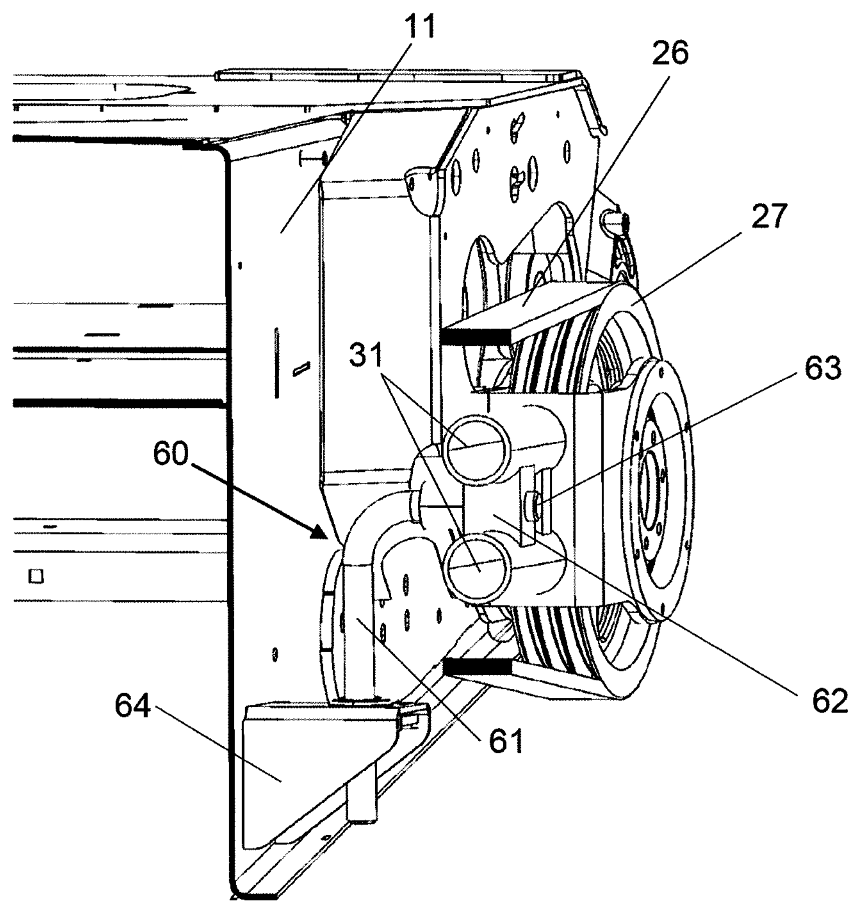
FIG. 6 illustrates a possible manner in which a belt drive according to the invention may be connected to the feeder housing.

As seen in FIG. 2, and in more detail in FIG. 6, an additional connection 60 may be present between the bridge structure 30 and the feeder housing 11, and placed in close proximity to the first pulley 25. This connection is aimed at limiting the free rotation of the belt drive 21 as a whole about its own longitudinal axis. This degree of freedom is a consequence of the presence of the two universal joints 35 and 36. The connection 60 comprises an L-shaped rod 61, that is coupled to a support block 62 fixed to the bridge structure 30, for example welded to and mounted in between the tubes 31. The horizontal portion of the L-shaped rod 61 is rotatable relative to the support block 62. The support block 62 and the horizontal portion of the L-shaped rod 61 are movable relative to each other in the axial direction of said horizontal portion, wherein this axial movement is limited between the bend of the L-shaped rod and a blocking bolt 63 at the outer end of the L-shaped rod. The vertical portion of the L-shaped rod is capable of moving up and down and of rotating in any direction (preferably by a ball joint) relative to a bracket 64 fixed to the side of the feeder housing 11. In this way, the bridge structure 30 is capable of undergoing any displacement relative to the feeder housing 11 actuated by the tilting movements of the header, while the rotation of the bridge structure 30 about its own longitudinal axis is limited to a predefined range. The connection 60 is preferably placed as close as possible to the first pulley 25, as the movements of the bridge structure 30 actuated by the header movements are smaller in this area. However, the connection 60 could placed on the side of the second pulley 27.

The connection 60 may be omitted, in which case a limited free rotation of the bridge structure 30 about its longitudinal axis is allowed, which will however necessarily be limited by a number of constructional constraints determined for example by the dimensions of the belt drive 21 and its spatial relation to the cradle frame 20 and the feeder housing 11, or by the characteristics of the joints 35 and 36. According to a number of embodiments, these constraints are sufficient to limit the free rotation of the bridge structure, and in those cases the connection 60 is not required.

Figures 7A, 7B, 7C:
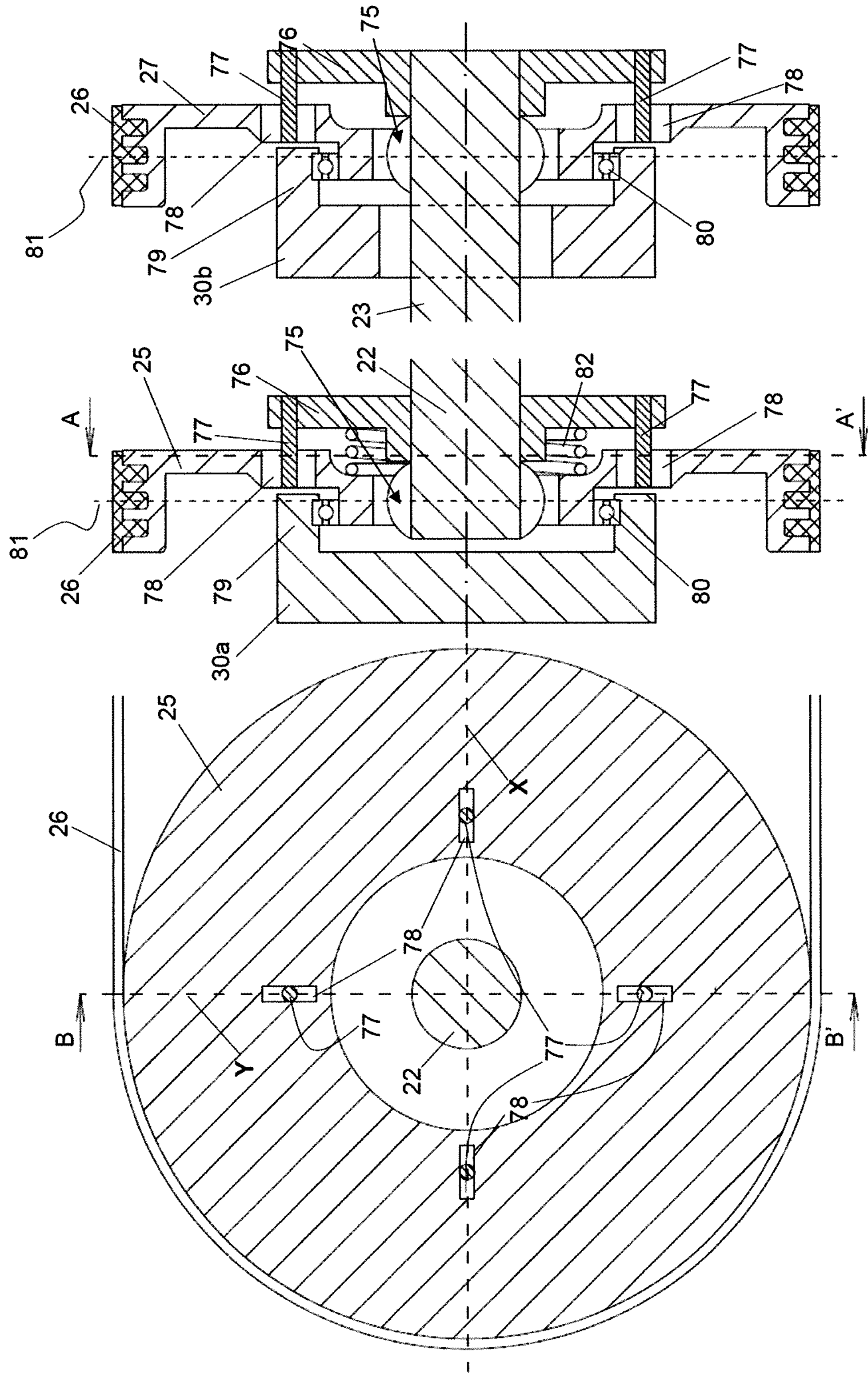
FIGS. 7*a*-7*c* show an alternative embodiment of the coupling between the first and second axle and the respective first and second pulley of the belt drive.

FIGS. 7*a*-7*c* and 8*a*-*b* illustrate two alternative structures of the belt drive 21, having however the same functionality as the embodiment described above. FIGS. 7*a*-7*c* show a first alternative. FIGS. 7*a* and 7*b* show section views of the first axle 22 and the first pulley 25 at the feeder side. FIG. 7*c* shows a section view of the second axle 23 and the second pulley 27 at the side of the cradle frame. The belt 26 is visible in all the views. Referring first to FIGS. 7*a* and 7*b*, the first pulley 25 is mounted at the end of the axle 22 via a spherical bearing 75 that allows a misalignment of the pulley 25 relative to the axle 22. A disc 76 is fixed to the axle 22, for example through a spline connection, so that the disc 76 rotates together with the axle 22. The disc 76 is provided with 4 guiding members in the form of rods 77 extending outward from the surface of the disc in the direction of the pulley 25. The rods 77 are fixed to, for example welded to the disc 76, and oriented parallel to the axle 22. The rods 77 are preferably placed along two orthogonal lines X and Y as shown in the drawing. However, the number of guiding members, their exact shape and their position may be different from the embodiment shown. What is important is that the guiding members 77 are able to interact with elongated radial openings 78 provided in the pulley 25, into which openings the guiding members 77 are inserted so as to transfer the rotation of the axle to the rotation of the pulley 25, while a misalignment between the axle 22 and the pulley 25 is allowed via the spherical bearing 75. In the embodiment shown, the openings have the form of 4 radially oriented slots 78, placed at angular positions which correspond to the positions of the rods 77, so that the rods 77 are inserted into the slots 78. The rods 77 are thereby movable relative to the slots 78 in the longitudinal direction thereof. The diameter of the rods 77 is dimensioned relative to the width of the slots 78 so that the rods 77 may move easily up and down in the slots 78. A limited lateral play between the rods 77 and the slots 78 is allowable. However in the embodiment shown, virtually no lateral movement of the rods 77 relative to the slots 78 is possible. In this case, suitable materials may be chosen, which allow sliding of the rods relative to the slots, possibly aided by a suitable lubricant or coating. Through the interaction between the rods and the slots, the disc 76 transfers the rotation of the axle 22 to a rotation of the pulley 25, whilst allowing a misalignment between the axle 22 and the pulley 25. In this way, this construction is equivalent to the function of the universal joint 35 in the first embodiment.

As seen in FIG. 7*c*, the second pulley 27 is coupled to the second axle 23 in the same manner as described above for the first axle and the first pulley, i.e. by a spherical bearing 75, a disc 76 fixed to the second axle 23 and provided with rods 77 which are slideably inserted into radial slots 78 in the second pulley 27.

The bridge structure 30 in this embodiment is located to one side of the pulleys 25 and 27. FIGS. 7*b* and 7*c* respectively show the first and second portions 30*a* and 30*b* of the bridge structure, each comprising a ring 79. The pulleys 25 and 27 are rotatable relative to this ring 79 via ball bearings 80. The bodies of the bridge portions 30*a* and 30*b* are depicted as beam elements which are translatable in a suitable manner relative to each other in the longitudinal direction of the bridge structure. The second bridge portion 30*b* could for example be a frame that is translatable relative to the beam element 30*a* through rollers, as suggested earlier in this description.

On both sides of the belt drive 21, i.e. at the side of the first pulley 25 and at the side of the second pulley 27, the central plane 81 of the belt 26 is preferably lying close to or coinciding with the central planes of the spherical bearing 75 and of the ball bearings 80, so that a minimum of tilting forces are generated in the coupling. An optional compression spring 82 may be mounted between the first pulley 25 and the first disc 76. If present, this compression spring limits the rotation of the bridge structure 30 about its own longitudinal axis, and thereby has the same effect as the connection 60 shown in FIG. 6. The compression spring 82 may therefore replace this connection 60 in the embodiment of FIGS. 7*a*-7*c*. The compression spring 82 is preferably placed at the feeder side, as shown in the drawings, but according to another embodiment, the spring 82 may be placed at the cradle frame side, i.e. between the second pulley and the disc 76 at this side. Or compression springs may be placed both at the feeder side and at the cradle frame side.

Compared to the version with universal joints 35 and 36, the embodiment of FIGS. 7*a*-7*c* provide a higher resistance, of the coupling between the pulleys and the axles, to forces acting perpendicularly on these axles. This is because the torque transfer of the axle 22 towards the pulley 25 (at the feeder side) or vice versa (at the cradle frame side) is separated from the function of allowing a misalignment between the axles and pulleys on both sides. The torque transfer function is fulfilled by the rods 77, while the misalignment function is fulfilled by the spherical bearings 75.

Figure 8B:
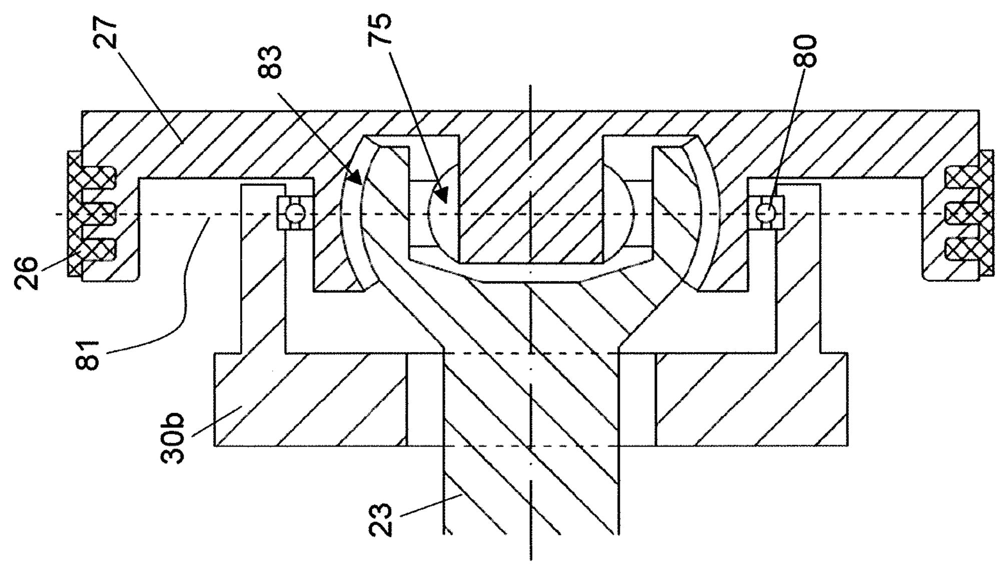
FIGS. 8*a* and 8*b* show another alternative embodiment of the coupling between the first and second axle and the respective first and second pulley of the belt drive.
Figure 8A:
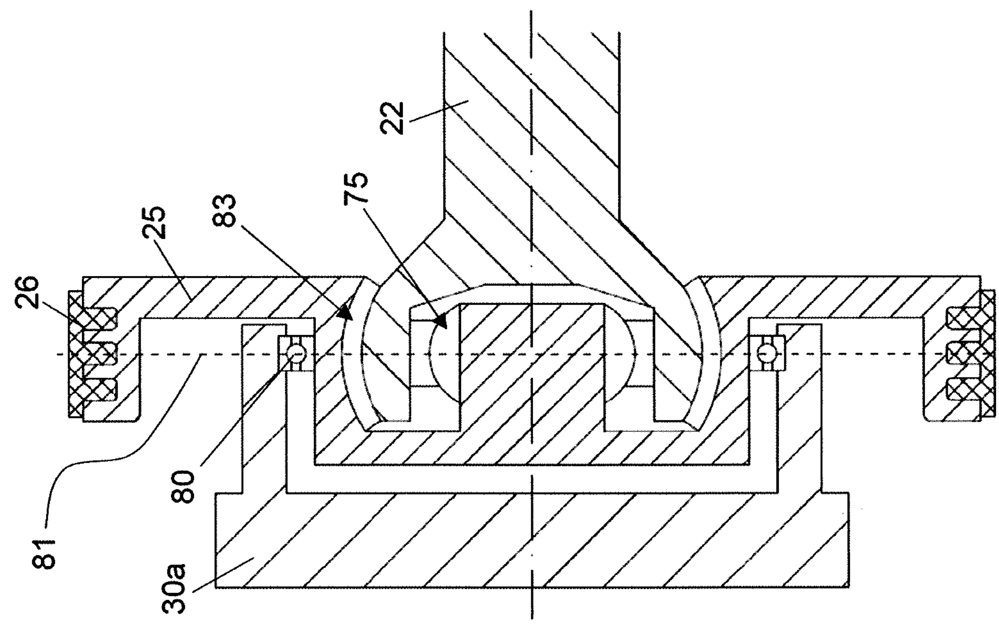

FIGS. 8*a*-8*c* show another alternative having the same advantage as stated in the previous paragraph. In this case, the misalignment function is again fulfilled by spherical bearings 75 on the feeder side (FIG. 8*a*) and the cradle frame side (FIG. 8*b*). However, the torque transfer on both sides is realized by a crowned spline connection 83. The bridge structure 30 is again mounted to one side of the pulleys 25 and 27. The bridge structure portions 30*a*, 30*b* may be constructed in the same way as described above for the embodiment shown in FIGS. 7*a*-7*c*. Once again, the centre plane 81 of the belt 26 is preferably as close as possible to or coinciding with (as is the case the drawing), with the center planes of the spherical bearings 75 and the ball bearings 80.

Optionally, a second belt drive is mounted on the other side of the feeder. The second belt drive may be identical to the first drive 21, but mirrored with respect to the longitudinal axis of the feeder. The header is then equipped with a second drive axle configured to be coupled to the second axle 23 of the opposite belt drive. Both belt drives may be coupled to the driveline by a cross shaft through the feeder.

The invention claimed is:

1. A combine harvester comprising:

a feeder at a front of the harvester, the feeder comprising a housing and a cradle frame mounted at a front of the feeder, wherein the cradle frame is configured to receive a header comprising a header drive axle oriented transversely to a forward direction of travel of the harvester when the header is coupled to the cradle frame, and wherein the cradle frame is movable relative to the feeder housing; and a driveline configured to drive a rotation of the header drive axle when the header is coupled to the feeder, the driveline comprising a first axle, a second axle, and a belt drive arranged laterally with respect to the feeder housing, the driveline further configured to transmit a rotation of the first axle that is rotatable about a rotation axis which is fixed relative to the feeder housing, to a rotation of the second axle, configured to be coupled to the header drive axle, the second axle being rotatable about a rotation axis that is fixed relative to the cradle frame, the belt drive comprising:

a first pulley coupled to the first axle through a first coupling that allows a misalignment between the rotation axis of the first axle and a rotation axis of the first pulley, a second pulley coupled to the second axle through a second coupling that allows a misalignment between the rotation axis of the second axle and a rotation axis of the second pulley, a belt mounted on the first pulley and the second pulley, a tensioning system for the belt, and an extendable bridge structure mounted between the first pulley and the second pulley, wherein the first pulley and the second pulley are configured to rotate relative to the bridge structure and wherein the bridge structure is extendable and retractable in a longitudinal direction of the belt drive, so that the first pulley and the second pulley remain essentially aligned in a same plane, regardless of a position of the cradle frame.

2. The combine harvester according to claim 1, wherein the first coupling and the second coupling are universal joints or homokinetic joints.

3. The combine harvester according to claim 1, wherein the first coupling comprises:

a spherical bearing between the first axle and the first pulley;

a disc fixed to the first axle; and one or more guiding members fixed to the disc, wherein the first pulley comprises one or more elongated openings oriented in a radial direction of the first pulley, into which one or more elongated openings the one or more guiding members are inserted so as to be movable relative to the one or more elongated openings by moving in a longitudinal direction of the one or more elongated openings, so that the one or more guiding members actuate rotation of the first pulley together with the first axle, while a misalignment is allowed between the first pulley and the first axle.

4. The combine harvester according to claim 3, further comprising a compression spring between the first pulley and the disc fixed to the first axle.

5. The combine harvester according to claim 3, wherein the second coupling comprises:

a spherical bearing between the second axle and the second pulley;

a disc fixed to the second axle; and one or more guiding members fixed to the disc, wherein the second pulley comprises one or more elongated openings oriented in a radial direction of the second pulley, into which one or more elongated openings the one or more guiding members are inserted so as to be movable relative to the one or more elongated openings by moving in a longitudinal direction of the one or more elongated openings, so that the one or more guiding members actuate rotation of the second pulley together with the second axle, while a misalignment is allowed between the second pulley and the second axle.

6. The combine harvester according to claim 5, further comprising:

a first compression spring between the first pulley and the disc fixed to the first axle; and a second compression spring between the second pulley and the disc fixed to the second axle.

7. The combine harvester according to claim 1, wherein the first coupling comprises a first spherical bearing between the first axle and the first pulley and a first crowned spline connection, so that the first pulley and the first axle rotate together while a misalignment is allowed between the first pulley and the first axle.

8. The combine harvester according to claim 1, wherein the bridge structure comprises a first portion and a second portion, wherein the first pulley is rotatable relative to the first portion and the second pulley is rotatable relative to the second portion, and wherein the first portion and the second portion are configured to slide or roll relative to each other to thereby extend or retract the bridge structure.

9. The combine harvester according to claim 8, wherein each of the first portion and the second portion of the bridge structure comprises one or more tubes so that the one or more tubes of one of the first portion and the second portion are slidable inside the one or more tubes of the other of the first portion and the second portion.

10. The combine harvester according to claim 8, wherein one or more compression springs are mounted between the first portion and the second portion of the bridge structure.

11. The combine harvester according to claim 1, wherein the tensioning system comprises at least one tensioning roller in contact with the belt, the at least one tensioning roller being mounted at an end of a bracket that is pivotably mounted on the bridge structure, and wherein the at least one tensioning roller is pushed against the belt by a spring force exerted by a compression spring, a tension spring, or a torsion spring.

12. The combine harvester according to claim 11, wherein the bridge structure comprises a first portion and a second portion, wherein the first pulley is rotatable relative to the first portion and the second pulley is rotatable relative to the second portion, and wherein the first portion and the second portion are configured to slide or roll relative to each other to thereby extend or retract the bridge structure, and wherein the bracket is pivotable about a pivot located on one of the first portion and the second portion, and wherein the compression spring, tension spring, or torsion spring is mounted between the bracket and a point on the other of the first portion and the second portion.

13. The combine harvester according to claim 11, wherein a second tension roller is rotatably mounted at an opposite end of the bracket, the second roller being in contact with the belt on an opposite side of the first roller.

14. The combine harvester according to claim 1, wherein the second pulley comprises an internal gear wheel fixed to a side of the second pulley, and wherein a hydraulic motor is mounted on the bridge structure, the hydraulic motor being configured to actuate rotation of a gear wheel configured to drive rotation of the internal gear wheel and thereby rotation of the second pulley in a direction opposite compared to a direction applied when the combine harvester is operated during a harvesting run.

15. The combine harvester according to claim 1, wherein a gear wheel is fixed to the second axle, and wherein a hydraulic motor is mounted on the cradle frame, the hydraulic motor being configured to actuate rotation of a gear wheel configured to drive the rotation of the gear wheel fixed to the second axle, and thereby rotation of the second pulley in a direction opposite compared to a direction applied when the harvester is operated during a harvesting run.

16. The combine harvester according to claim 1, further comprising a mechanical connection between the bridge structure and the feeder housing, wherein the mechanical connection is configured to allow the cradle frame to move relative to the feeder housing, while limiting rotation of the bridge structure about its longitudinal axis to a predefined range.

17. The combine harvester according to claim 16, wherein the mechanical connection comprises a bracket fixed to a side of the feeder housing, an L-shaped rod having a horizontal portion and a vertical portion that is movable axially relative to the bracket and rotatable in any direction relative to the bracket, and a connection block fixed to the bridge structure, wherein the horizontal portion of the L-shaped rod is rotatable relative to the block, and wherein the block and the horizontal portion are movable relative to each other within a set of predefined limits.

* * * * *